United States Patent
Hoffmann

[15] 3,679,249
[45] July 25, 1972

[54] ROD END CONNECTOR

[72] Inventor: Donald R. Hoffmann, Wayne, Mich.
[73] Assignee: Ford Motor Company, Dearborn, Mich.
[22] Filed: May 21, 1971
[21] Appl. No.: 145,680

[52] U.S. Cl. ............................................. 287/93, 287/20.5
[51] Int. Cl. ..................................................... F16c 11/00
[58] Field of Search .......................................... 287/93, 20.5

[56] References Cited

UNITED STATES PATENTS

| | | | |
|---|---|---|---|
| 3,401,960 | 9/1968 | Saunders | 287/93 X |
| 3,253,480 | 5/1966 | Fernberg | 287/93 X |
| 3,231,300 | 1/1966 | Moroney | 287/93 |

Primary Examiner—Andrew V. Kundrat
Attorney—John R. Faulkner and John J. Roethel

[57] ABSTRACT

A connecting device for coupling an actuating rod to a lever member. The connecting device is an integrally molded plastic unit comprising a base member having a rod portion receiving aperture at one end; a retention means for holding the connecting means on the lever member, the retention means projecting from one side of the base member and having a bore axially aligned with the aperture; and a socket forming wall formed on the other side of the base member to receive an end of the actuating rod. A plurality of upstanding rod retention legs having overhanding lip portions receive the actuating rod as its right angled end is inserted through the bore of the retention means on the base member.

2 Claims, 6 Drawing Figures

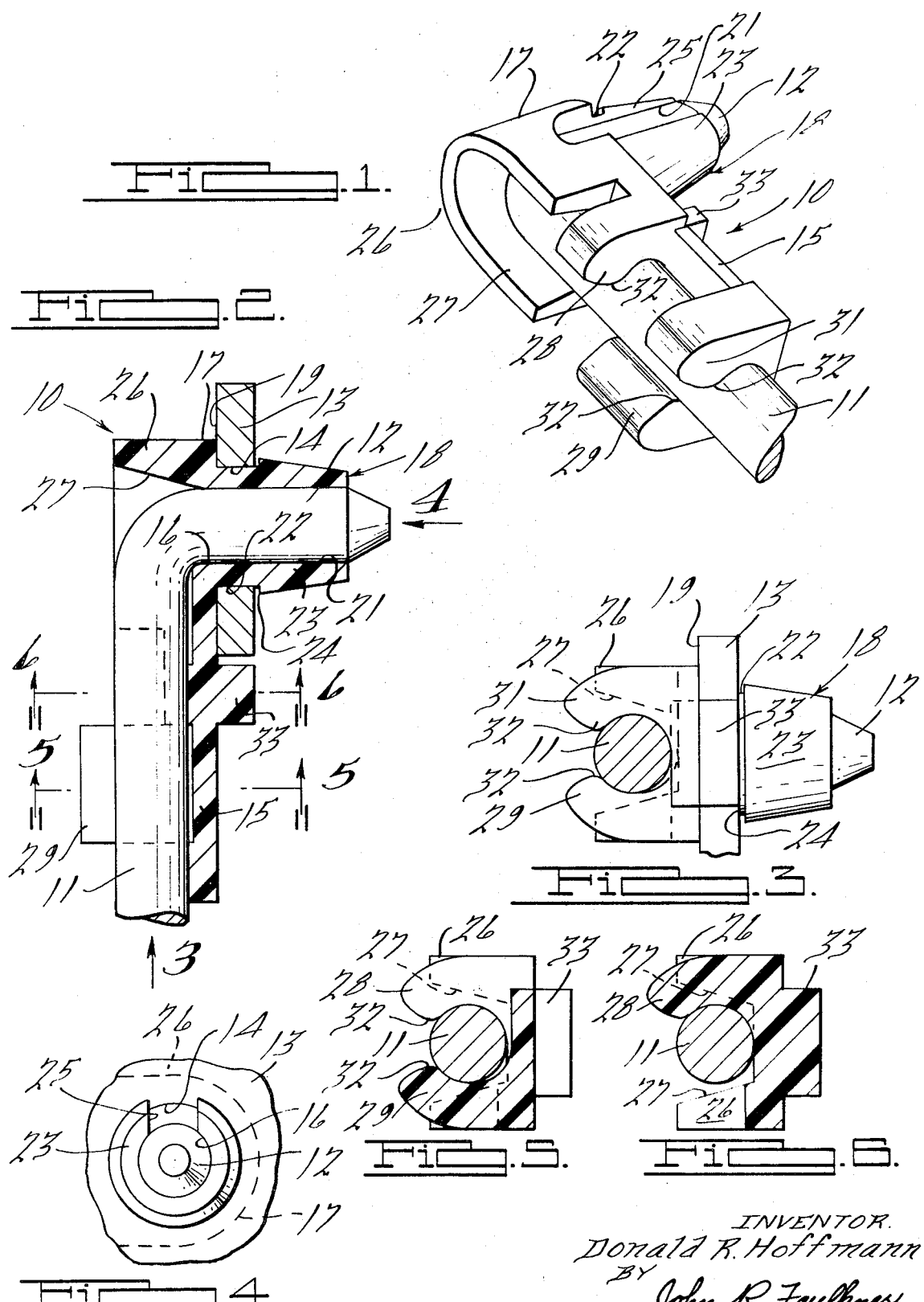

ROD END CONNECTOR

BACKGROUND OF THE INVENTION

The present invention represents an improvement over a connecting device disclosed in W. N. Moroney U.S. Pat. No. 3,231,300, issued Jan. 25, 1966. The Moroney patent discloses a plastic connecting means in which the right angled end of an actuating rod is pushed through an aperture in the device and retained in a cylindrical shaped recess in a head portion of the latter. A retention recess receives the actuating rod at the juncture of the main rod portion with its right angled end portion. Since this juncture is a curved corner only a small portion of the recess walls are engaged by the actuating rod and much of the retention strength is wasted.

T. B. Saunders U.S. Pat. No. 3,401,960 issued Sept. 17, 1968 discloses a rod end fastener in which access to the recess in which the rod is received is on a base member having the rod end receiving aperture at one end. To assemble the rod end to this connecting means, the rod end must first be inserted in the aperture. Then the body of the rod must be rotated about the aperture axis to bring it into alignment with the retention recess into which it can be snapped. Thus, although greater retention strength is available, the extra rotation effort slows down the assembly line worker. Frequently, the rod main portion is rotated in the wrong direction in the plane of the recess. It then becomes necessary to reverse the direction of rotation in order to bring the main body portion of the rod into alignment with the recess so that the assembler can snap the rod into the retention recess, further slowing down the assembly operation.

The object of the present invention is to provide a connecting means achieving the single motion assembly of the Moroney connecting device while at the same time achieving the greater retention strength of the Saunders device.

SUMMARY OF THE INVENTION

The present invention relates to a connecting device for coupling an elongated actuating rod terminating in a short substantially right angle end portion to an apertured lever member. The connecting device is an integrally molded plastic unit having a substantially flat rectangular base member with an actuating rod end portion receiving aperture at one end. A substantially cylindrical retention means projects from one side of the base member and has a bore therethrough axially aligned with the base member aperture. The cylindrical retention means comprises a reduced shank portion having a diameter complementary to the lever member aperture and a tapered shoulder portion slightly larger in cross sectional area than the shank portion. The shank portion is interposed between the base member and the tapered shoulder portion. The cylindrical retention means has at least one axially extending slot in the wall thereof which slot extends into the base member and permits resilient compression of the tapered shoulder portion to a size in which the latter will pass through the lever member aperture. The shoulder portion upon projecting through the lever member aperture expands to prevent disconnection of the connecting device and lever member. The improvement in the connecting means as above described embodying the present invention comprises a base member having on its other side, the side opposite the cylindrical retention means side, at its apertured end an upstanding wall forming a socket opened at the top and at one side adapted to receive the actuating rod end. A plurality of upstanding rod retention legs having overhanging lip portions between which the actuating rod is received for snap fit retention as its right angled end is inserted through the bore of the retention means completes the structure of the other or upper side of the base member.

A further improvement comprises a stop on the cylindrical retention means side of the base member engageable with a predetermined lever member edge to orient the connecting device on the lever member in a predetermined relationship.

DESCRIPTION OF THE DRAWING

Further features and advantages of the present invention will be explained in greater detail making reference to the description which now follows, reference being had to the drawing in which:

FIG. 1 is a perspective view of a fragmentary portion of an actuating rod coupled to a connecting device embodying the present invention;

FIG. 2 is a vertical section of the actuating rod coupled to a connecting device and assembled to aperture lever member;

FIG. 3 is an end elevation in the direction of the arrow 3 in FIG. 2;

FIG. 4 is an end elevation in the direction of the arrow 4 in FIG. 2;

FIG. 5 is a sectional view on the line 5—5 of FIG. 2; and

FIG. 6 is a sectional view on the line 6—6 of FIG. 2.

DETAILED DESCRIPTION OF THE INVENTION

Referring now to the drawing, the connecting device, generally designated 10, embodying the present invention is molded from a resilient plastic material, such as nylon. It primarily functions as a device for coupling an elongated actuating rod 11 having a short substantially right angled end portion 12 to a lever member 13 having an aperture 14 therethrough.

The connecting device 10 has a substantially rectangular flat base 15 with an actuating rod end portion receiving aperture 16 at one end 17. The end 17 may be rounded as seen in FIG. 1. A substantially cylindrical retention means 18 projects from the underside of the base member. This underside is the side adapted to abut the upper surface 19 of the lever member 13. The cylindrical retention means 18 has a bore 21 therethrough that is equal in diameter to the aperture 16 in the base member end 17 and in effect may be considered an axial extension of the latter. Externally, the cylindrical retention means 18 comprises a reduced shank portion 22 having a diameter complementary to the aperture 14 in the lever member 13. From the shank portion 22 to the extremity of the cylindrical retention means 18, the latter has a tapered shoulder portion 23. The shoulder portion 23 tapers at its edge 24 from a cross sectional area slightly larger than the shank portion 22 to a cross sectional area slightly smaller than that of the aperture 14.

The cylindrical retention means 18 has at least one axially extending slot 25 in its wall. The slot 25 extends into the base member and functions to permit resilient compression of the tapered shoulder portion 23 to a size in which the latter will pass through the aperture 14 in a lever member 13. As will be readily understood, as soon as the tapered shoulder portion 23 is shoved through the aperture 14 to a depth at which the shank portion 22 becomes aligned with the lever member metal thickness, shoulder portion 23 expands. The connecting device 10 and the lever member 13 then are retained in assembled relation as best seen in FIG. 2.

To this point, the connecting device 10, in general, followed the disclosure of the W. N. Moroney U.S. Pat. No. 3,231,300, issued Jan. 25, 1966. The connecting device embodying the present invention has the following improvements over the Moroney device:

The base member 15 has at its aperture end on the side opposite the cylindrical retention means 18 an upstanding wall 26 forming a pocket or socket opened at the top and at one side. The socket wall 26 is internally tapered at 27 to provide a guide leading to the aligned apertures 16–21. Extending the length of the base member 15 are a plurality of upstanding, spaced, retention legs 28, 29 and 31, respectively. The retention legs are staggered on opposite longitudinal edges of the base member, See FIG. 1. The interior surface of each leg is radially undercut to form an overhanging lip 32. When viewed in the direction of arrow 3 in FIG. 2, the overhanging lip 32 of the retention legs appear to form a tunnel or cylindrical recess with the top openings smaller than the diameter of the rod 11.

The assembly of the actuating rod 11 to the lever member 13 is through the medium of a connecting device 10. The connecting device 10 is first assembled to the lever member 13, as described above. Next, the right angled end portion 12 of the actuating rod 11 is directed toward the socket formed by the wall 26 on the base member 15, the tapered interior wall 27 acting as a guide to aim the end of the end portion 12 of the actuating rod toward the aperture 16 in the base member 15 and then on through the bore 21 in the cylindrical retention means portion 18. Because of the upstanding socket forming wall 26, it is necessary to align the actuating rod 11 with the longitudinal axis of the connecting device 10. If this is not done, it is impossible to push the rod end 12 into the aperture or bore 21 of the cylindrical retention means 18. Application of a moderate amount of pressure on the actuating rod or the base member 15 causes the rod retention legs 28, 29 and 31 to resiliently yield and permit the passage of the actuating rod 11 between the overhanging lip portionS 32. As soon as the widest part of the rod 11 passes between the lip portions 32, the retention legs will snap back to their original position and the actuating rod will have a snap-fit retention in the connecting device 10.

One other improvement disclosed is the provision of a laterally extending rib 33 across the bottom of the base member 15 of the connecting device 10. The function of the rib 33 is to provide a go-no-go relationship to the lever member 13 so that the connecting device 10 can only be assembled on the lever member in a predetermined relationship. As shown in FIG. 2, the aperture 14 in the lever member is slightly off center with respect to the width of the lever member 13. The connecting device 10 can be assembled to the lever member 13 only on the side in which there is clearance between the stop or rib 33 and the adjacent edge of the lever member. This is of importance on the assembly line where it is desired to have the connecting devices oriented in a proper direction on the lever members to receive the actuating rods as the vehicle body moves along the assembly line.

It will be understood that the invention is not to be limited to the exact construction shown and described, but that various changes and modifications may be made without departing from the spirit and scope of the invention as defined in the appended claims.

What I claim is:

1. A connecting device for coupling an elongated actuating rod terminating in a short substantially right angle end portion to an apertured lever member,
   the connecting device being an integrally molded plastic unit having a substantially rectangular flat base member with an actuating rod end portion receiving aperture at one end thereof,
   a substantially cylindrical retention means projecting from one side of the base member and having a bore therethrough axially aligned with the base member aperture,
   the cylindrical retention means comprising a reduced shank portion having a diameter complementary to the lever member aperture and a tapered shoulder portion slightly larger in cross sectional area than the shank portion,
   the shank portion being interposed between the base member and the tapered shoulder portion,
   the cylindrical retention means having at least one axially extending slot in the wall thereof which slot extends into the base member,
   the slot permitting resilient compression of the tapered shoulder portion to a size in which the latter will pass through the lever member aperture,
   the shoulder portion upon projecting through the lever member aperture expanding to prevent disconnection of the connecting device and lever member,
   the base member having on its other side at its apertured end an upstanding wall forming a socket open at the top and at one side to receive the actuating rod end,
   a plurality of upstanding rod retention legs,
   the rod retention legs having over-hanging lip portions between which the actuating rod is received for snap-fit retention as its right angle end is inserted through the bore of the retention means,
   and a stop on the cylindrical retention means side of the base member engageable with a predetermined lever member edge to orient the connecting device on the lever member in a pre-determined relationship.

2. A connecting device according to Claim 1, in which:
   the retention legs are staggered on opposite longitudinal sides of the base member and form a cylindrical recess in axial alignment with the open side of the socket and the aperture in the base member.

* * * * *